3,081,803
MATERIAL DISPENSING APPARATUS
Gerard A. Frank, Allentown, Pa., assignor to Western Electric Company, Incorporated, New York, N.Y., a corporation of New York
Filed Sept. 24, 1959, Ser. No. 841,994
3 Claims. (Cl. 141—181)

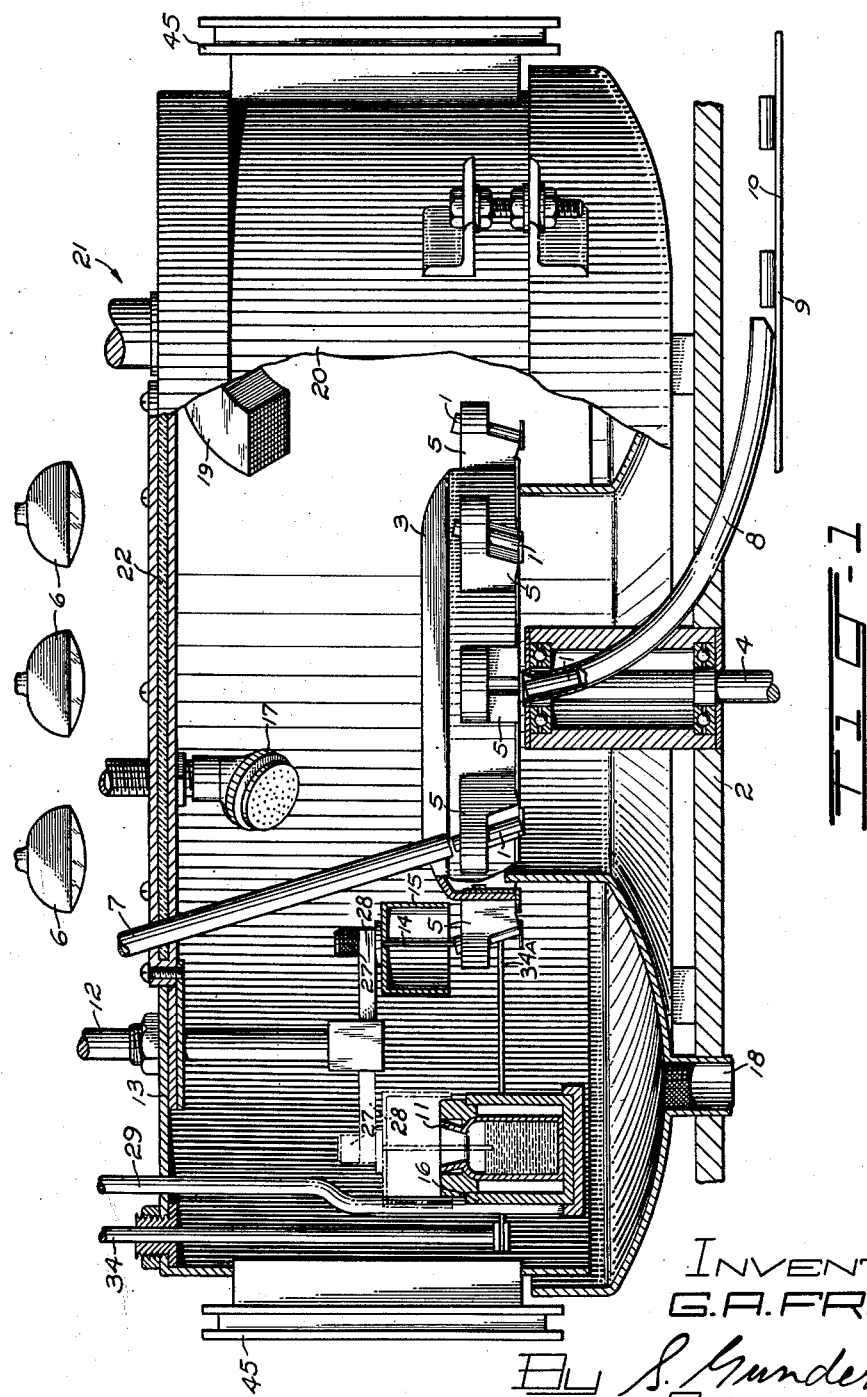

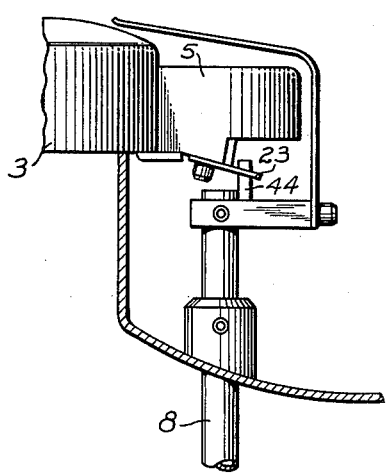
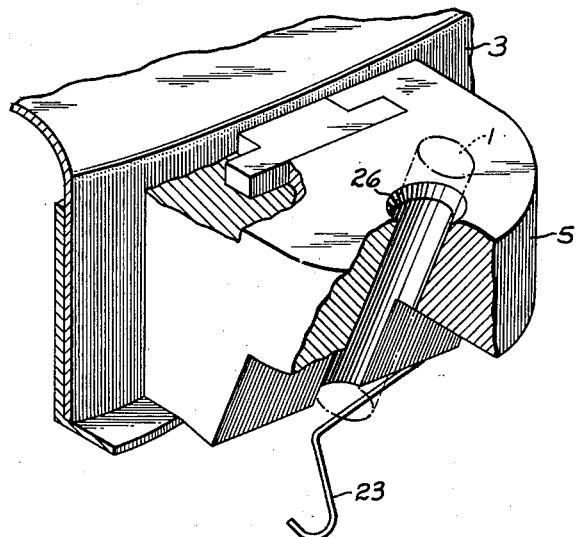
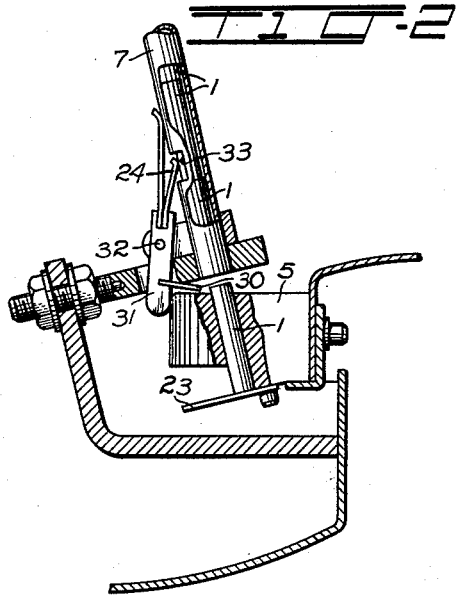

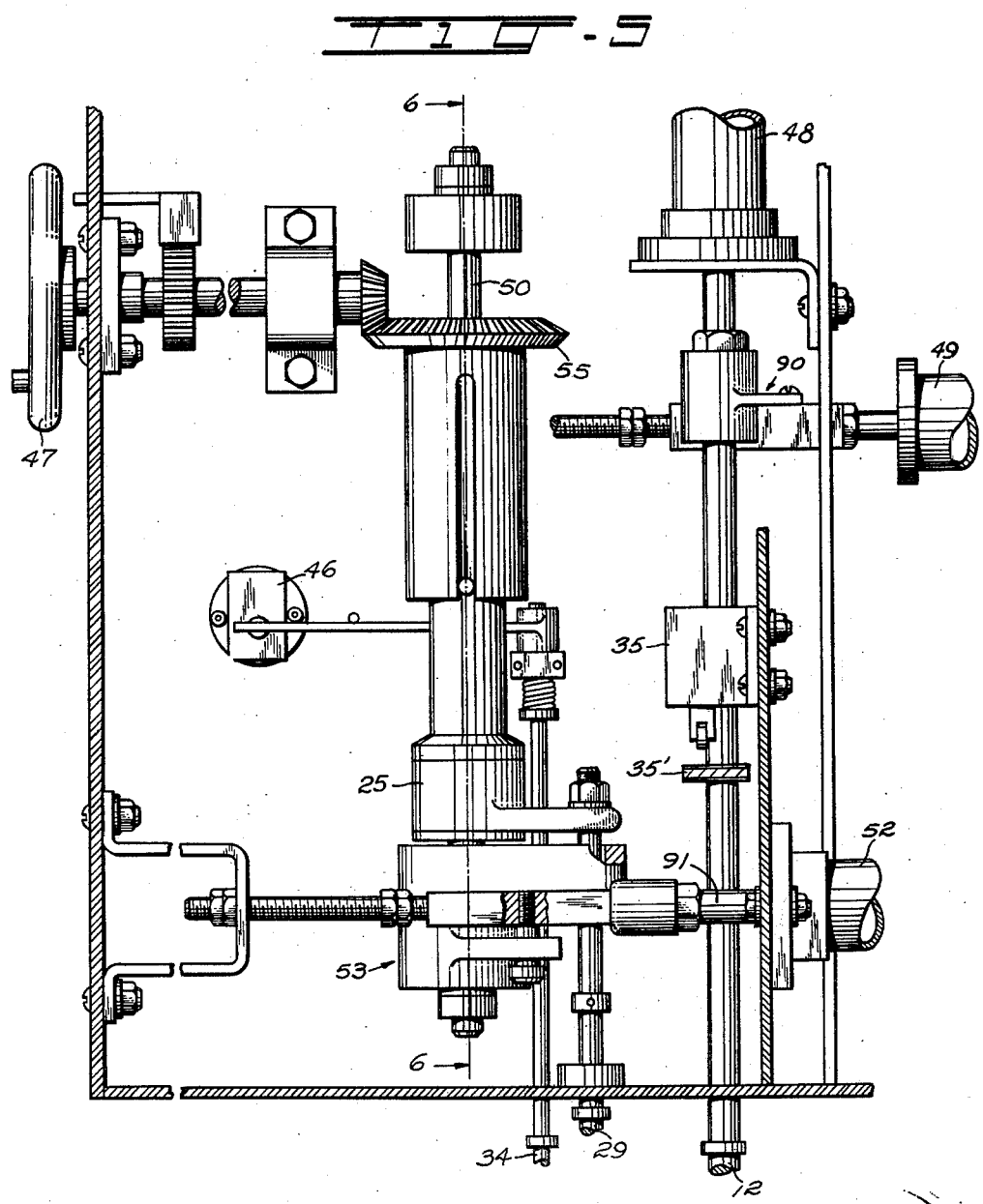

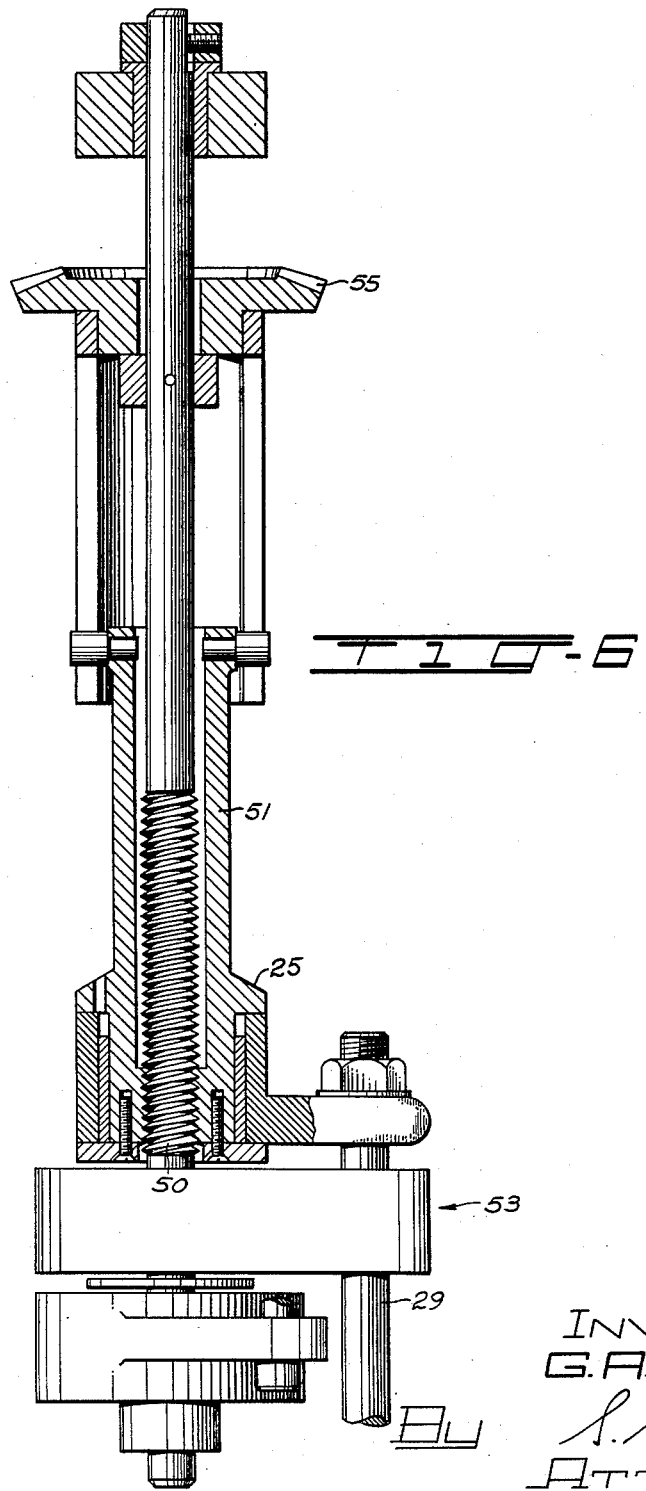

This invention relates to material dispensing apparatus and more particularly to apparatus for depositing small amounts of radium bromide in bulbs.

In the fabrication of certain electron discharge devices, small quantities of radioactive material must be deposited in the bulbs. For example, a globule of radium bromide in a liquid carrier is introduced into the glass bulb of certain types of gas diode tubes. Apparatus utilized for such deposition must be safe from radiological contamination, be precise in measuring the amount of liquid deposited into the bulbs, and attain a speed of operation sufficient for automatic manufacture.

A conventional hypodermic syringe has been considered for dispensing a radium mixture wherein the syringe is mounted for automatic and accurate operation. The use of a hypodermic syringe has presented difficulty in that the needle clogs and, due to the pressure in the needle supply tube, the tube ruptures causing a radiological hazard.

An object of this invention is to provide a material dispensing apparatus which is automatic in operation and permits physical isolation and shielding of the material being dispensed.

A further object of the invention is to provide a material dispensing apparatus which inserts small measured quantities of material into bulbs.

With this and other objects in view, the invention comprises a material dispensing apparatus including a material container open at the top and a material dispensing plunger which is moved vertically and in rotation. The plunger intermittently rotates and descends, dipping into the container and then, ascends and rotates dipping into a bulb positioned by an indexing turret. The apparatus further includes an ingress tube which positions bulbs vertically inclined about the circumference of a rotating turret with the open ends of the bulbs upward. The turret, upon rotation, indexes the bulbs to a position where the descending material dispensing plunger enters the bulb, touches a wall of the bulb, thereby transferring the measured liquid onto the inner wall of the bulb. Upon further rotation of the turret the bulbs are removed through an egress tube for further processing.

Other objects and advantages will be apparent from the following description when considered in conjunction with the accompanying drawings wherein:

FIG. 1 is a cutaway side view of the operating portion of the apparatus;

FIG. 2 is a fragmentary sectional view illustrating the bulb ingress mechanism;

FIG. 3 is a fragmentary view illustrating the bulb holder;

FIG. 4 is a fragmentary sectional view illustrating the bulb egress mechanism;

FIG. 5 is a cutaway side view illustrating the driving mechanism for the liquid metering apparatus;

FIG. 6 is a sectional view illustrating the clutch of the driving mechanism of FIG. 5.

Figure 7:
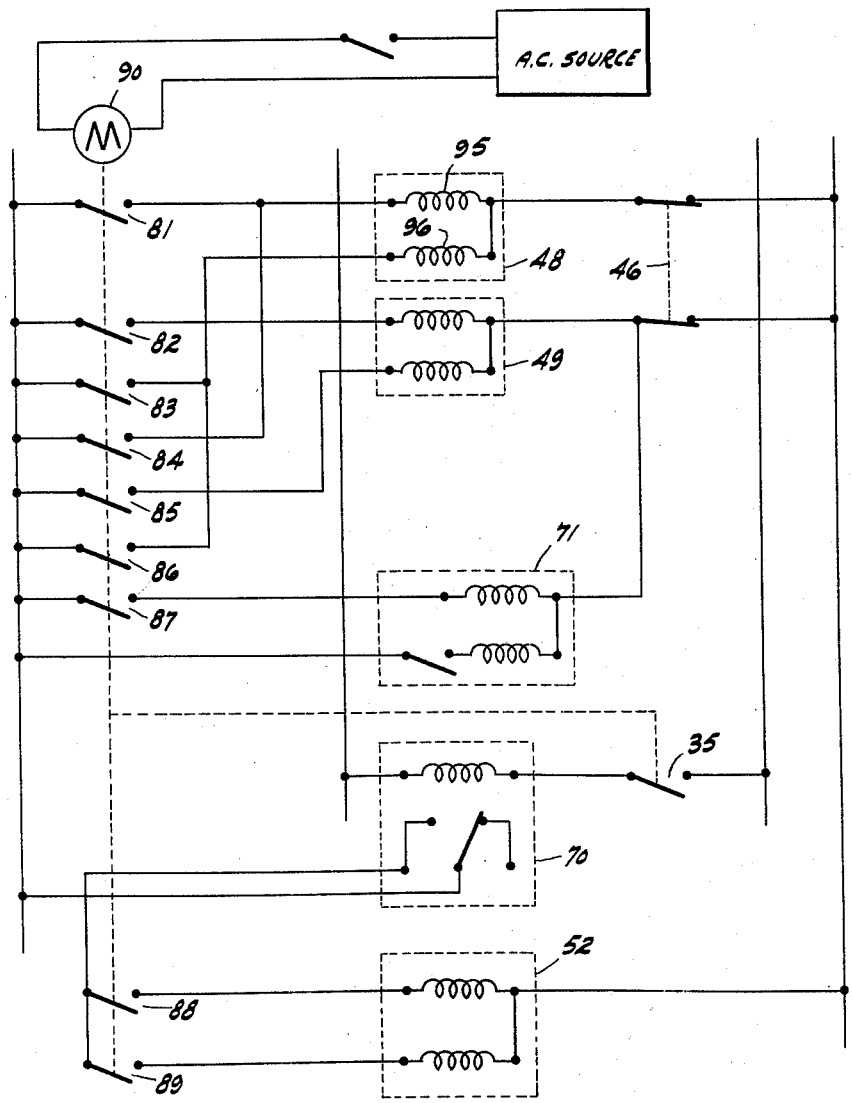
FIG. 7 is a timing diagram illustrating the timing of the various operations involved in the invention.

Referring now to the drawings, FIG. 1 illustrates sealed chamber 21 containing the operating portion of the apparatus. Chamber 21 consists of chamber base 2, circular chamber wall 20, and chamber top 13. Bulbs 1 are sorted, either by hand or by automatic means such as a vibrating hopper, so that their open tops all face in the same direction and are fed by gravity to chamber 21 through ingress tube 7. To prevent bulb breakage, ingress tube 7 is preferably of soft plastic such as polystyrene. At the end of ingress tube 7 bulb 1 falls, by gravity, into cavity 26 in bulb holder 5. Cavity 26 is angularly disposed with respect to the vertical, consequently, bulb 1 when in position in cavity 26 forms a slanted cavity, open at the top. A plurality of bulb holders 5 are equally spaced and mounted about the circumference of turret 3. Turret 3, preferably of the indexing type of turntable, is driven by turret shaft 4. The bulbs are held in the holders 5 by springs 23 extending across the bottom of the cavities 26.

At a selected point, plunger 14 is positioned so as to descend into cavity 26 of an article holder 5 located at the globule depositing station. Plunger 14 is adjusted, in relationship to cavity 26, so that it touches lightly a side wall of slanted bulb 1 within cavity 26 upon its descent. The size and shape of plunger 14 depend upon the amount of material desired to be deposited. A hexagon shaped or fluted rod of .063 inch diameter has been found satisfactory to deposit radium bromide in bulbs for gas diode tubes. Plunger 14 is connected through adjustable locking means 27 and arm 28 to plunger rotating column 12. At a preselected distance from the material dispensing station a bottle 11 of the material to be dispensed is secured. For mechanical convenience and safety bottle 11 is illustrated as being 180° from the dispensing position of plunger 14 near access door 45 at the left in FIG. 1.

Rotation of turret 3 which is actuated periodically by air cylinder 71 shown in FIG. 7 carries bulbs 1 above the opening of egress tube 8 where a fixed cam 44 deflects springs 23 so that bulbs 1, by gravity, fall into egress tube 8 and down to removal station 9. In FIG. 1, bulbs 1 are transported from removal station 9 by conveyor belt 10.

For more rapid drying of the liquid material being dispensed, heating means, for example infrared lamps 6, are utilized. Lamps 6 are positioned over chamber window 22 in chamber top 13.

For the dispensation of radioactive material, for example radium bromide, the apparatus has various safety features. To prevent radioactive contamination the walls, and other surfaces, of the apparatus are of polished stainless steel. Lead or other radiological shielding is provided around bottle 11 by concentric shield 16 and around plunger 14 by concentric shield 15. By use of shields 15 and 16 at no time may material give off radioactive radiation in the horizontal direction which may be harmful for an operator. Water nozzle 17 leads to a valve controlled water supply. Upon excess radioactivity a valve, external to sealed chamber 21, releases clean water sprays to water nozzle 17 which sprays the water onto the potential contamination area at the left of FIG. 1. The water then flows out of sealed chamber 21 through drain 18. Gas exhaust 19 in seal chamber 21 is protection against radioactive gas escaping into the atmosphere surrounding the apparatus.

The means of inserting bulbs into bulb holders 5 is illustrated in FIG. 2. Bulbs descend by gravity within ingress tube 7. They are held within ingress tube 7 by ingress holder spring 24. Bulb holder 5, when positioned beneath ingress tube 7 rotates spring holder 31 about its pivot pin 32 forcing closure spring 30 away from the bottom opening of ingress tube 7 and permitting bulb 1 to descend into cavity 26. Simultaneously, holding spring 24 is pushed against the next bulb in ingress tube 7 through ingress tube slit 33. Rotation of turret 3 causes spring-loaded spring holder 31 to return to its normal position, with holding spring 30 closing the mouth of ingress tube 7.

Bulb egress means is illustrated in FIG. 3 wherein bulb holder spring 23 at the bottom of bulb holder 5 closes the bottom of cavity 26. In FIG. 4 article holder 5 has been rotated to a position above egress tube 8. Spring 23 is released by rotating into the fixed cam 44, thereby opening the bottom of cavity 26 and permitting bulb 1 to fall, by gravity, into egress tube 8.

The driving mechanism for the fluid metering portion in sealed chamber 21 is illustrated in FIG. 5 which shows plunger rotating column 12 and bottle lifting column 29. A ratchet type clutch mechanism 53 (as disclosed in Patent 2,715,991 which issued August 23, 1955), driving bottle lifting screw 50 to raise housing 25 to lift column 29 is more fully illustrated in FIG. 6. Sensing column 34 is spring loaded so as to cause an extension 34A thereon to rotate into empty bulb holders 5. Upon such rotation switch 46 is actuated operating to halt rotation and descent of plunger rotating and lifting column 12 thereby preventing deposition of material into holders 5 in the absence of a bulb 1 therein preventing a hazardous accumulation of material. Handwheel 47, through a bevel gear 55 adjusts the initial elevation of housing 25 and therefor plunger 14. Plunger column 12, through air cylinders 48 and 49 (for lifting and rotating respectively), rotates, rises and descends. The pressure in cylinders 48 and 49 is controlled by a conventional cycle timer shown in FIG. 7.

Maintenance of a constant level of liquid material in bottle 11 is by means of switch 35, a counting mechanism 70, and bottle lifting column 29. Every elevation of plunger rotating column 12 operates switch 35 by fixed cam 35' on column 12. Pulses from switch 35 register, by means of a switch operated solenoid, on a counting mechanism 70. After a predetermined number of such rotations (the number depending upon the quantity of material removed from bottle 11 upon each such rotation) the counting mechanism, through air cylinder 52 actuates the clutch 53 to raise bottle lifting column 29 by an incremental amount. Ascent of bottle lifting column 29 raises bottle 11 restoring the liquid material to its original level relative to plunger 14.

In operation, bulbs are fed with their open tops uniformly up through ingress tube 7. Upon rotation of turret 3 bulbs 1 are rotated to the dispensing position. Plunger rotating column 12 rotates plunger 14 above material bottle 11. Plunger 14 descends into bottle 11, wherein plunger 14 picks up a globule of the material to be dispensed. Plunger rotating column 12 then lifts plunger 14 from bottle 11 and rotates it to the dispensing position. At the dispensing position plunger rotating column 12 again descends causing plunger 14 to descend into bulb 1. As bulb 1 is inclined within cavity 26 the material on plunger 14 contacts and adheres to the inner surface of bulb 1. Plunger 14 then is withdrawn from bulb 1 and is ready for its next rotation to above bottle 11. Bulb 1, in bulb holder 5, rotates until reaching the top of egress tube 8. Cam 44 thereupon operates spring 23 at the bottom of cavity 26 permitting bulb 1 to fall into egress tube 8 from whence it drops to removal station 9.

The timing of the various operations is illustrated in FIG. 7. Timing motor 90 drives a series of cam operated contacts 81–89 in sequence for governing the operation of the various air cylinders used to control the apparatus. When contact 81 closes, cylinder 48 is operated to raise the plunger column 12 and lift the plunger 14 from the bottle. Contact 82 then closes to operate cylinder 49 which through linkage 90 rotates column 12 and thus operates the arm 28 to position plunger 14 over the bulb at the dispensing station. Contact 83 closes, causing cylinder 48 to drive column 12 downwardly and insert plunger 14 into the tube. Contact 84 closes and raises column 12 and hence plunger 14 from the tube. Thereafter, contact 85 closes and cylinder 49 rotates column 12 to a position over the bottle 11. Contact 86 now closes and column 12 is again driven downwardly and the plunger 14 is inserted into the bottle 11. Following this operation, contact 87 is closed and cylinder 71 operates to rotate the turret 3 to move a new bulb 1 to the material dispensing station. Contacts 88 and 89 now close in succession but are ineffectual unless the counter 70 has been operated. As explained, after a predetermined number of operations of switch 35, the counter operates and an obvious circuit is prepared for operating cylinder 52 to raise the bottle to a new position. It is only when such a circuit is prepared that cylinder 52 operates to drive the clutch 53 by the movement of cylinder rod 91. The air cylinders used in the invention are of the type which are controlled by a pair of solenoids. Energization of one solenoid, for example, solenoid 95 associated with air cylinder 48, drives the piston in one direction while energization of the solenoid 96 drives the piston in the opposite direction.

The above described arrangements are illustrative of the application of the principles of the invention. Numerous other arrangements may be readily devised by those skilled in the art which will embody the principles of the invention and fall within its scope.

What is claimed is:

1. An automatic dispensing apparatus for depositing material in hollow articles comprising a container for the material, a series of holders for the articles, means for moving the holders one by one to a dispensing station, a plunger for transferring material from the container to an article in a holder at the dispensing station, the plunger being adapted to retain a globule of material at its lower end, a carrier for said plunger, and means for automatically moving said carrier to successively insert the plunger into the container from a position above the container, completely withdraw the plunger from the container, insert the plunger into the hollow article at the dispensing station and then completely withdraw the plunger from the hollow article and return the plunger to a position above the container, each holder being adapted to secure a hollow article so that its interior side wall is at an acute angle with respect to the plunger axis, and the plunger on its insertion in a hollow article contacts and deposits a globule of material on said interior wall.

2. Apparatus as claimed in claim 1, wherein there are a plurality of article holders affixed to a rotatable turret, means being provided for operating the turret in timed relationship to the plunger.

3. Apparatus according to claim 1 wherein each holder includes an inclined opening for holding a hollow article in a position between the horizontal and vertical.

References Cited in the file of this patent

UNITED STATES PATENTS

| | | |
|---|---|---|
| 2,507,753 | Blackhurst | May 16, 1950 |
| 2,520,278 | Freeman | Aug. 29, 1950 |
| 2,643,801 | Kollmeyer | June 30, 1953 |
| 2,654,459 | Connolly | Oct. 6, 1953 |
| 2,691,472 | Weimer | Oct. 12, 1954 |
| 2,932,330 | Donofrio | Apr. 12, 1960 |